R. P. HICKS.
GARDEN TRACTOR.
APPLICATION FILED APR. 10, 1920.
1,428,231.
Patented Sept. 5, 1922.
3 SHEETS—SHEET 3.
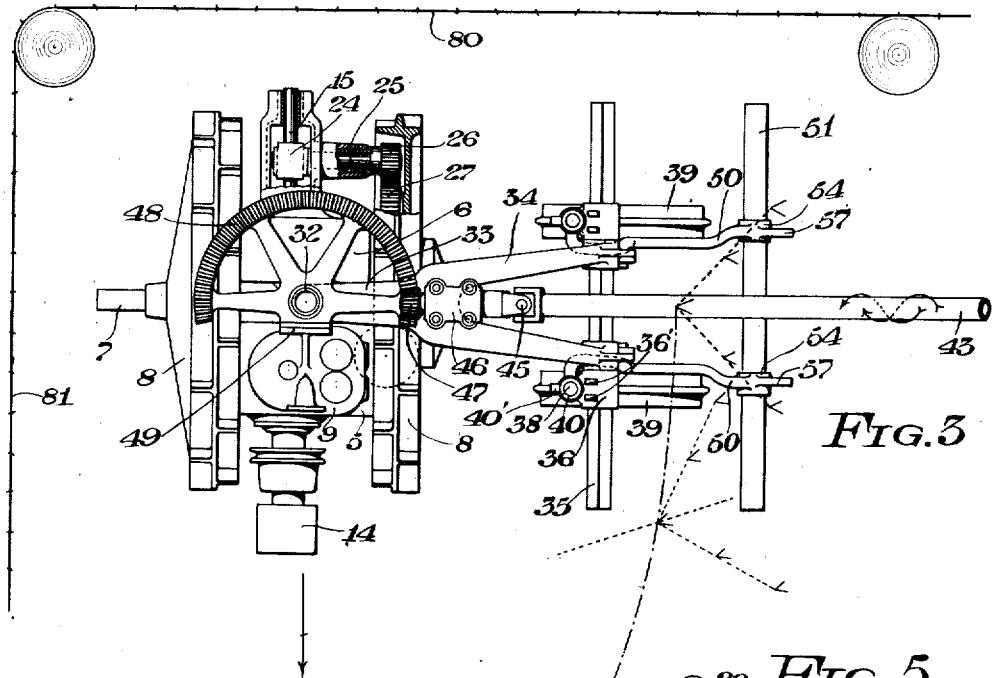
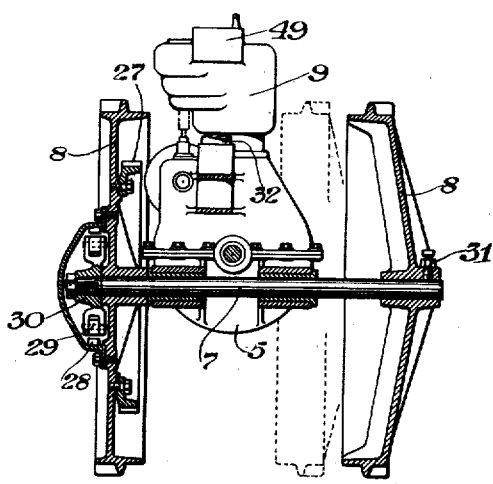
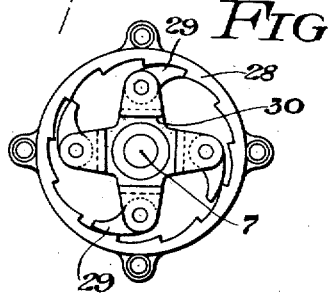
WITNESSES
O. L. Hyde
C. L. Nail
INVENTOR
Rex P. Hicks
By R. C. Caldwell
ATTORNEY Patented Sept. 5, 1922.

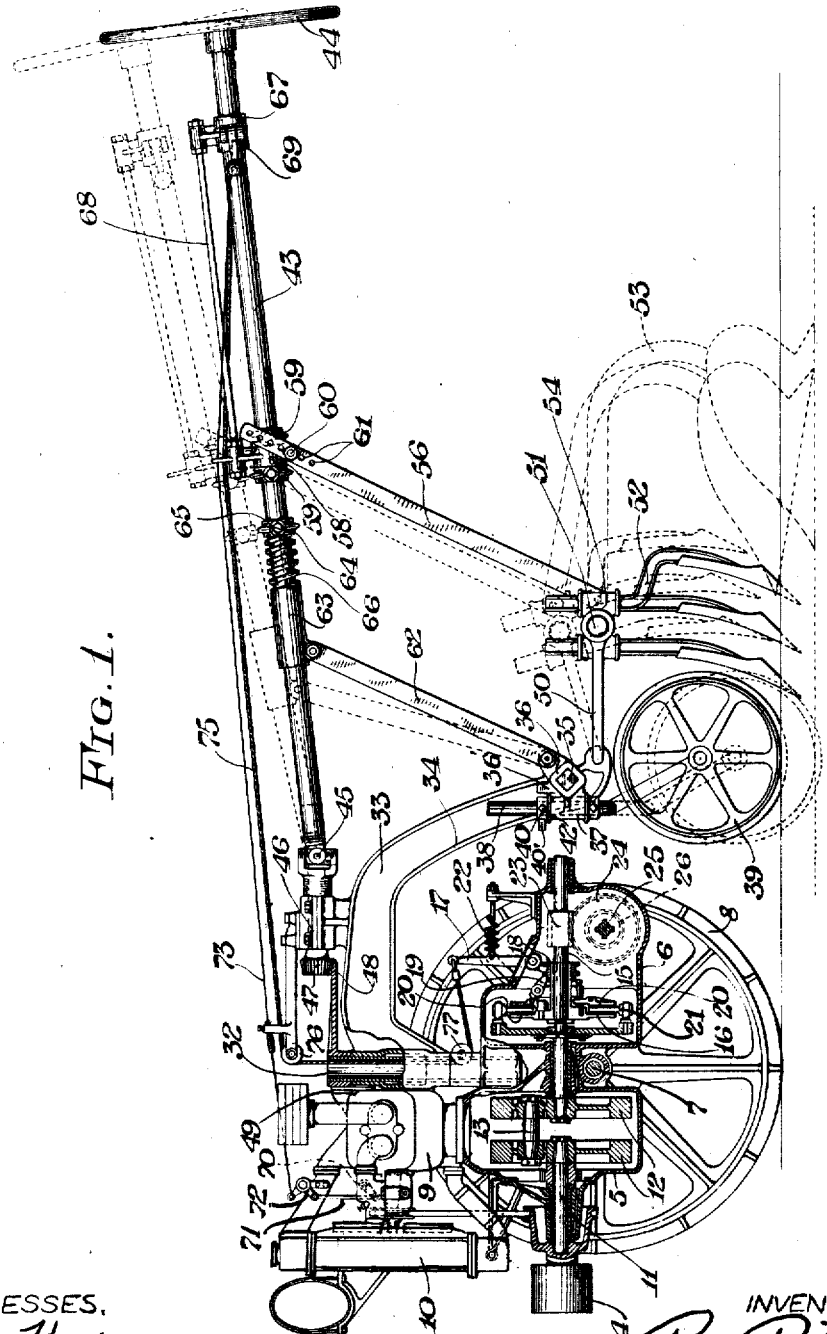

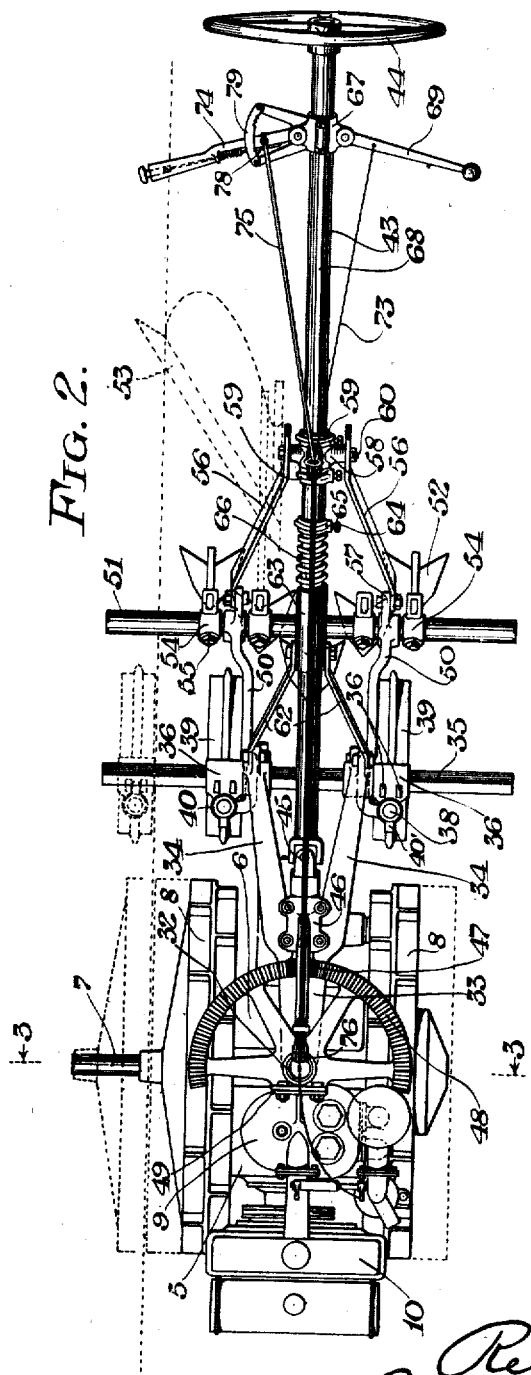

1,428,231

UNITED STATES PATENT OFFICE.

REX P. HICKS, OF MILWAUKEE, WISCONSIN.

GARDEN TRACTOR.

Application filed April 10, 1920. Serial No. 372,912.

*To all whom it may concern:*

Be it known that I, REX P. HICKS, a citizen of the United States, and resident of Milwaukee, in the county of Milwaukee and State of Wisconsin, have invented new and useful Improvements in Garden Tractors, of which the following is a description, reference being had to the accompanying drawings, which are a part of this specification.

The invention relates to tractors and more particularly to that type commonly denoted garden tractors.

Heretofore in tractors of this type the guiding handle or handles of the machine have been rigidly connected to the parts connected with the carrying or propelling wheels so that in making a turn or in steering out of the way of obstacles it is necessary to shift the whole machine and also for the operator to shift from side to side, which is difficult when he is walking between or straddling a row of plants. Furthermore, where it is necessary to turn these machines at a fence corner sufficient leeway has to be provided between the fence and the last row to allow the operator to shift the steering handle and also considerable avaible planting space is wasted at these corners because the machine necessarily cuts off these corners in making the turn. These difficulties have been obviated by the present invention which provides a relative movement between the guiding means and the propelling means of the tractor so arranged as to be easily moved relatively to each other.

A further object of the invention is to provide a tractor of this type which may be used for plowing and be easily guided during the plowing operation.

A further object of the invention is to provide for shifting the implements relatively to the propelling mechanism to bring one or more of the cultivator tools between the plants in a row for hilling corn or other vegetables.

A further object of the invention is to provide simple and effective mechanism for raising the tools from the soil and for limiting the depth at which they work in the soil.

The invention further consists in the several features hereinafter set forth and more particularly defined by claims at the conclusion hereof.

In the drawings: Fig. 1 is an elevation view of a tractor embodying the invention, parts being broken away and parts being shown in section; Fig. 2 is a plan view of the tractor; Fig. 3 is a plan view of the machine showing the manner of making a sharp turn; Fig. 4 is a section taken on the line 3—3 of Fig. 2; Fig. 5 is a detail view of the differential connection betwen the wheel and the driven axle.

The frame of the machine is formed by the engine crank case 5 and transmission casing 6 which are mounted on an axle 7 carrying traction wheels 8. The engine 9, such as an internal combustion engine with cooling radiator 10 has its crank shaft 11 mounted in the crank case and includes two wheels 12 which serve as fly wheels and as crank disks for the crank pin 13 which is operatively connected to the piston of the engine by a connecting rod in the usual manner. The crank shaft 11 extends at right angles to and is disposed above the axle 7 and carries a pulley 14 at its front end for auxiliary power purposes.

A transmission shaft 15 is journalled in the transmission casing 6 in line with the drive shaft to which it may be drivingly connected by a suitable clutch, such as a friction clutch 16 which is operated by means of a lever 17 acting upon a collar 18 which in turn acts upon a lever 19 engageable with one of the clutch disks 20 on the shaft 15 between which disks a disk 21 connected to the shaft 11 is disposed. The swinging of the lever 17 moves the collar 18 upon the shaft 15 to either clutch or unclutch the friction disks. A spring 22 anchored to the frame and connected to the lever 17 acts upon said lever and its associated parts to normally maintain the clutch elements in engagement with each other.

A worm 23 is mounted or formed on the shaft 15 and meshes with a worm wheel 24 on a transversely disposed drive shaft 25 journalled in the transmission casing and carrying a gear 26 meshing with a large gear 27 secured to one of the traction wheels 8 which wheel is loosely mounted on the axle and drives through a differential to said axle and thence to the other traction wheel which is fixed to the axle. Any suitable differential may be used and I have here shown a simple but suitable form comprising a ratchet wheel 28 formed in the hub of the loosely mounted traction wheel and a plurality of pawls 29 pivotally supported upon a spider 30 upon the axle 7. The axle 7 is extended out on one side so that the relatively fixed traction wheel may be moved lengthwise thereon and be secured thereto in fixed position by a set screw 31, this adjustment permitting the traction wheels to be spaced at varying distances apart depending upon the nature of the work the machine is required to do.

A hollow post 32 is mounted on the frame in vertical position between the two traction wheels and in line with the axle 7. A draft frame or beam 33 is pivotally mounted on this post for movement in a horizontal plane and has a forked lower end forming diverging arms 34 carrying a castor supporting member or beam 35. Collars 36 are adjustably secured upon the member 35 and each has a vertically disposed boss 37 carrying a castor shaft 38 having a castor wheel 39 mounted thereon at its lower end. The shaft 38 may be vertically adjusted in the boss 39 and secured in adjusted position by means of set collars 40 and screws 42. The collars 36 may be moved lengthwise of the member 35 so that the castor wheels may be spaced at different distances apart. The vertical and longitudinal adjustment of the castor wheels with respect to the member 35 is of importance when the device is used in plowing as it enables that castor wheel on the land side of the furrow to be moved out and lowered down to the bottom of the furrow adjacent the edge of the land side so that it will assist in guiding the machine after the making of the first furrow. When adjusted for plowing the shaft 38 is prevented from turning by bringing a lug 40' on the collar 40 between two lugs 36' on the collar 36.

The machine is guided and turned by means of a long shaft or steering member 43 having a handwheel 44 at its rear end and a universal joint 45 intermediate its ends, the forward portion of the shaft being journalled in a bearing 46 on the beam 33 and carrying a bevel gear 47 meshing with a segmental bevel gear 48 secured to the post 32 so that the turning of said shaft will, through the gearing connection just described, produce a relative movement between the propelling mechanism and the implement carrying means. The upper portion of the engine has a bracket 49 secured to the gear 48.

Links 50 carry a draw bar 51 at their outer ends and are pivotally connected at their inner ends to the arms 34 of beam 33. The implements, such as the cultivator tools 52 or a plow 53, are adapted to be secured to the draw bar by collars 54 which may be clamped in different positions to said draw bar by means of set screws 55 or other suitable clamping means.

The implements are raised and lowered by a vertical swinging movement of the handle or shaft 43 by means of links 56 connected at their lower ends to the draw bar through an arm 57 on the links 50 and adjustably connected at their upper ends to a sleeve 58 journalled on the shaft 43 between two collars 59 adjustably fixed to said shaft. The sleeve 58 carries bolts 60 which are adapted to be inserted in any one of a series of holes 61 in the upper ends of the link so that the handle 43 may be held at the desired inclination.

The depth to which the implements may be lowered into the soil is limited by means of links 62, a sleeve 63 and an adjustable collar 64. The links 62 are pivotally connected at their lower ends to the lower ends of the arms 34 and at their upper ends to the sleeve 63 loosely mounted on the shaft 43. The collar 64 is adjustably secured to the shaft 43 by a clamping screw 65 and a spring 66 is preferably interposed between the collar and the end of the sleeve adjacent thereto. By adjusting the collar at the desired position upon the shaft the depth to which the implements may be lowered is effected as the lowering of the shaft 43 with the implement causes the sleeve 63 to move forwardly against the spring which is compressed against the stop collar 64.

A bracket 67 has a sleeve portion loosely mounted on the shaft 43 and is connected to the sleeve 58 through a tie rod 68. This bracket has a throttle control lever 69 pivotally connected thereto. The throttle valve 70 is connected by a link 71 to a bell crank lever 72 which is connected by a suitably guided flexible connection 73 with the control lever 69. A clutch control lever 74 is also pivotally mounted on the bracket 69 and is connected through a flexible connection 75 to the upper arm of the clutch lever 17, suitable guides for this connection being provided including pulleys 76 and 77 which direct a portion of this connection down through the hollow interior of the post 32. The clutch may be secured in operative or inoperative position by locking the lever 74 by means of the spring pressed latch 78 and the notched lock plate 79.

The control levers 69 and 74 are disposed near the hand-wheel 44 so as to be in a convenient position for the operator.

As previously stated, the relative movement between the propelling mechanism and the implement is effected by the turning of the shaft 43. By reason of this relative movement the propelling mechanism may be turned at right angles to the steering shaft and handle 43 and the implements as shown in Fig. 4. This is particularly advantageous in making a turn at the corner of a field because it enables the machine to be run close to the side fence 80 since it is not necessary to swing the handle out toward this fence in making the turn and because the implements may be turned in a narrow radius so that the rows may be extended closer to the side fence 81 at the corner than is possible with a construction in which the propelling mechanism and the handle are turned as a unit. Furthermore, it enables the operator to turn out for obstructions in the path of the traction wheels by shifting the steering column to one side or the other so that he may walk in one row or another and still keep the implements and the propelling mechanism in their proper position relative to the rows. It will be further noted that in the present construction the traction wheels are the steering wheels of the machine.

I desire it to be understood that this invention is not limited to any specific form or arrangement of parts except in so far as such limitations are specified in the claims.

What I claim as new and desire to secure by Letters Patent is:

1. In a garden tractor, the combination of propelling mechanism, a draft beam pivotally connected to said mechanism for horizontal swinging movement with respect thereto, castor wheels supporting the free end of the beam, means for connecting implements with the beam, a vertically movable rotatable steering shaft extending to a position behind the implement and controlled by the operator following behind the tractor, and means for turning the beam relative to the propelling mechanism on the rotation of said shaft.

2. In a garden tractor, the combination of propelling mechanism including a frame, a draft beam pivotally mounted on the frame for horizontal, swinging movement with respect thereto, castor wheels supporting the free end of the beam, an implement-carrying draw bar connected with the beam, a rotatable steering shaft vertically pivotally connected at one end to the beam, means connecting said draw bar and shaft for raising and lowering said draw bar, and means for turning the propelling mechanism relatively to the beam on the rotation of said shaft.

3. In a garden tractor, the combination of propelling mechanism, a draft beam pivotally connected to said mechanism for horizontal swinging movement with respect thereto, supporting means for the free end of the beam, means for connecting implements with the beam, a vertically movable rotatable steering shaft extending to a position behind the implement and controlled by the operator following behind the tractor, and means for turning the beam relative to the propelling mechanism on the rotation of said shaft.

4. In a garden tractor, the combination, with the propelling mechanism, of a draft beam connected to said propelling mechanism for relative horizontal swinging movement with respect thereto, a steering member mounted on the beam and movable vertically, means for turning the propelling mechanism with respect to the beam on the turning of said member, a draw bar vertically swingingly connected to said beam and connected to said steering member to be raised or lowered by the latter, and means for limiting the downward movement of said draw bar.

5. In a garden tractor, the combination, with the propelling mechanism, of a draft beam connected to said propeller mechanism for relative horizontal swinging movement with respect thereto, a steering member mounted on the beam and movable vertically, means for turning the propelling mechanism with respect to the beam on the turning of said member, and a draw bar vertically swingingly connected to said beam and connected to said steering member to be raised or lowered by the latter.

6. In a garden tractor, the combination with propelling mechanism, of a horizontally swinging draft beam, a vertically swinging draw bar connected to said beam, a rearwardly extending handle member vertically pivotally mounted in its forward end upon said beam, and a connection between the draw bar and said member for raising and lowering the draw bar on the swinging of said member.

7. In a garden tractor, the combination, with the propelling mechanism including a frame, of an upright post on the frame, a draft beam pivotally mounted on the post for lateral swinging movement and having diverging arms at its free end, a member secured to said arms, castor wheels adjustably secured to said member, a draw bar vertically swingingly connected to said beam, a steering handle supported by the beam and vertically movable with respect thereto, and a link connecting said draw bar to the steering handle.

8. In a garden tractor, the combination, with the propelling mechanism including a frame, of an upright post on the frame, a draft beam pivotally mounted on the post for lateral swinging movement, a member secured to the free end of said beam, castor wheels adjustably secured to said member, an implement draw bar vertically swingingly connected to said beam, a steering handle supported by the beam and vertically movable with respect thereto, a link connecting said draw bar to the steering handle, and stop means for limiting the lowering movement of said handle.

9. In a garden tractor, the combination, with the propelling mechanism including a frame, of an upright post on the frame, a draft beam pivotally mounted on the post for lateral swinging movement, a vertically movable steering member rotatably mounted on its forward end upon said beam, a gear on said member, a gear on the post meshing with said first named gear for relative movement between said beam and frame on the turning of the steering member, a draw bar vertically swingingly connected with the beam and connected to said steering member to be raised and lowered by the latter irrespective of the rotation thereof.

10. In a garden tractor, the combination of a horizontally swinging draft beam, a vertically movable member, means to which the implements are secured connected to said beam and to said member to be raised or lowered by the latter, and adjustable means connecting the beam with said member to limit the depth to which the implements are lowered.

11. In a garden tractor, the combination, with the propelling mechanism, of a draft beam connected thereto for lateral swinging movement, a rearwardly extending rotatable steering handle journalled on the beam, a gearing connection between said handle and the propelling mechanism for turning said beam with respect thereto, means to which the implements are secured connected to said beam and to said handle, said handle being movable vertically to raise or lower the implements, and adjustable means connecting the beam with the handle to limit the depth to which the implements are lowered.

12. In a garden tractor, the combination with the frame, of a handle mounted to swing vertically, means to which the implements are secured operatively connected to the frame and to the handle to be raised and lowered by the latter, and adjustable means to limit the swing of the handle with respect to the frame to thereby limit the depth to which the implements are lowered.

13. In a garden tractor, the combination of propelling mechanism, a horizontally swinging draft beam connected to said mechanism and to which the implements are operatively connected, a shaft journalled at its front end upon said beam and extending rearwardly beyond it, said shaft having a vertically movable portion to which the implements are operatively connected to be raised or lowered by the vertical movement of said shaft, and a connection between said shaft and propelling mechanism for turning the beam relatively to said traction wheels.

14. In a garden tractor, the combination of a pair of traction wheels, an axle supported thereby, a power plant mounted on the axle and driving said wheels, a vertically disposed post in line with said axle, a draft beam, to which the implements are operatively connected, horizontally swingingly mounted on said post, a shaft journalled at its front end upon the beam and extending rearwardly beyond it, said shaft having a vertically movable portion to which the implements are operatively connected to be raised or lowered by the vertical movement of said shaft, and a connection between said shaft and post for turning the beam relatively to said traction wheels.

15. In a tractor, the combination, with a frame member, of means for connecting implements therewith including a vertically movable draw bar, a steering and control shaft, a sleeve on said shaft, links connecting said sleeve with the draw bar for vertical movement of said draw bar on similar movement of the handle, a sleeve slidably mounted on said shaft, a link connecting said slidable sleeve with said member, and an adjustable stop collar on said shaft cooperating with said sleeve to limit the lowermost swinging position of said shaft.

16. In a tractor, the combination, with a frame member, of means for connecting implements therewith including a vertically movable draw bar, a vertically movable control shaft supported above said frame member, means connecting said shaft and draw bar together for vertical movement thereof, a sleeve slidably mounted on said shaft, a link connecting said sleeve with said member, and an adjustable stop collar on said shaft cooperating with said sleeve to limit the lowermost swinging position of said shaft.

17. In a tractor, the combination of propelling mechanism, a draft beam pivotally connected to said mechanism for horizontal swinging movement with respect thereto, a draw bar operatively connected with the beam, a rotatable and vertically movable shaft extending rearwardly above the beam, means connecting said shaft with the propelling mechanism for relative movement between said mechanism and beam on the turning of said shaft, and means connecting said draw bar to said shaft to be raised or lowered by the latter.

18. In a tractor, the combination of a frame member, means for connecting implements therewith including a vertically movable draw-bar, a vertically movable control shaft, means connecting said shaft and draw-bar together for vertical movement thereof, a sleeve slidably mounted on said shaft, a link connecting said sleeve with said member, an adjustable stop collar on said shaft cooperating with said sleeve to limit the lowermost swinging position of said shaft, and a spring interposed between said collar and sleeve.

19. In a tractor, the combination of a frame member, means for connecting implements therewith including a vertically movable draw-bar, a vertically movable control member, means connecting said control member and draw-bar together for vertical movement thereof, and means connecting said control member and frame member together to limit the vertical movement of said control member.

In testimony whereof, I affix my signature.

REX P. HICKS.